United States Patent Office 3,379,519
Patented Apr. 23, 1968

3,379,519
COLUMBIUM-BASE ALLOY
Gordon D. Gemmell, Wilmington, Del., assignor, by mesne assignments, to Union Carbide Corporation, a corporation of New York
No Drawing. Continuation-in-part of application Ser. No. 72,846, Dec. 1, 1960. This application Dec. 11, 1961, Ser. No. 158,566
1 Claim. (Cl. 75—174)

This application is a continuation-in-part of my prior copending application Ser. No. 72,846, filed Dec. 1, 1960, now abandoned.

This invention relates to improved columbium-base alloys, and particularly to alloys which contain as essential ingredients columbium, zirconium, and tungsten.

The present invention is concerned with alloys which exhibit high strength at elevated temperatures over prolonged periods of time. Alloys possessing such properties are comprised of about 3 to 10% by weight zirconium, about 5 to 18% by weight tungsten, the balance being essentially columbium. Optional additions of other elements may be made to this alloy in order to impart to it certain other desirable characteristics, for example, increased workability of the alloys. More specifically, the alloys of this invention may contain up to 2.0% in total of one or more of the following elements: hafnium, thorium, yttrium, and the rare earth elements of atomic numbers 58 to 71, inclusive, and up to 0.2% in total of one or more of the elements boron and carbon. The rare earth elements of atomic numbers 58 to 71 are cerium, praseodymium, neodymium, promethium, samarium, europium, gadolinium, terbium, dysprosium, holmium, erbium, thulium, ytterbium, and lutetium.

For a clearer understanding of the invention, the following specific examples are given. These examples are intended to be merely illustrative of the invention and not in limitation thereof. The compositions are expressed in terms of weight percent as determined by the weight of the starting materials used. All tensile tests are according to the recommendations of the A.S.T.M. Designation E21–58T, and stress rupture testing is carried out according to practices recommended by the A.S.T.M. Standards Committee and given in Designation E139–58T.

EXAMPLE 1

An alloy comprising 5% zirconium, 10% tungsten, balance columbium, was prepared and tested for strength at high temperature as follows:

45.4 parts of powdered tungsten, 22.7 parts of zirconium sponge, and 385.9 parts of powdered columbium were blended and melted in a tungsten arc furnace using a water-cooled copper crucible, and maintaining an inert atmosphere in the furnace. The alloy thus prepared was cast into a tapered ingot three inches in length, and this ingot was machined to form a cylinder ½ inch in diameter. This cylinder was heated in argon to 800° C. and was swaged to a 50% reduction in cross-sectional area, cooled in air, and descaled and machined to prepare it for testing for high-temperature strength properties.

The test specimen was heat-treated in an electric furnace for nine hours at 2000° C. in vacuum, cooled to room temperature, and was then tested for tensile strength in vacuum at a temperature of 1100° C. Results of this testing are given in Table I below.

EXAMPLE 2

Following the same procedure as given in Example 1, an alloy of 10% zirconium, 10% tungsten, balance columbium, was prepared by blending and melting 45.4 parts of zirconium, 45.4 parts of tungsten, and 363.2 parts of columbium. An ingot was prepared and the alloy tested in the same manner as described in the preceding example. Results are given in Table I below.

TABLE I
[Tensile strength testing of Nb-Zr-W Alloys—Heat treatment: 9 hrs. at 2,000° C.—Tested in vacuum at 1,100° C. at a strain rate of 0.067 per minute]

| | Percent Composition | | | Strength | | Ductility | |
|---|---|---|---|---|---|---|---|
| | Zr | W | Nb | 0.2% Yield (p.s.i.) | Ultimate Tensile (p.s.i.) | Percent Reduction in Cross Sectional Area | Percent Elongation in ¾" Gauge Length; 0.125" Diam. |
| Alloy of Example: | | | | | | | |
| 1 | 5 | 10 | Bal. | 58,400 | 59,900 | 14 | 3 |
| 2 | 10 | 10 | Bal. | 54,900 | 56,000 | 5 | 3 |
| [These results may be compared with the following control tests under the same conditions] | | | | | | | |
| Control Sample: | | | | | | | |
| #1 | | | 100 | 7,740 | 8,150 | 91 | 32 |
| #2 | 1 | None | Bal. | | *33,800 | 0 | 0 |
| #3 | 5 | None | Bal. | 37,600 | 38,900 | 8 | 2 |
| #4 | 10 | None | Bal. | 36,900 | 38,900 | 2 | 2 |
| #5 | 15 | None | Bal. | 48,600 | 48,600 | 3 | 1 |
| #6 | 20 | None | Bal. | 50,900 | 51,200 | 0 | 0 |

*Fracture strength: Brittle fracture.

EXAMPLES 3 TO 7, INCLUSIVE

Other alloys of this invention were prepared in the same manner as given in Examples 1 and 2. These were heat treated in the same way and were subjected to stress-rupture testing at elevated temperatures. Results of these tests are given in Table II below.

TABLE II
[Stress-rupture testing of Nb-Zr-W alloys—Heat treatment: 9 hrs. at 2,000° C.—Tested in vacuum at 1,100° C.]

| | Percent Composition | | | Stress (p.s.i.) | Time-to-Rupture (Hrs.) | Percent Elongation in 1" Gauge Length; 0.160" Diam. |
|---|---|---|---|---|---|---|
| | Zr | W | Nb | | | |
| Alloy of Ex.: | | | | | | |
| 3 | 5 | 10 | Bal. | 35,000 | 3.3 | 3 |
| 4 | 5 | 10 | Bal. | 27,500 | 19.4 | 2 |
| 5 | 5 | 15 | Bal. | 35,000 | 26.1 | 7 |
| 6 | 5 | 15 | Bal. | 30,000 | 56.0 | 7 |
| 7 | 10 | 10 | Bal. | 30,000 | 3.2 | 5 |
| [These results may be compared with the following tests made under the same conditions] | | | | | | |
| Nb Metal | | | | 7,750 | 0.15 | 27 |
| Control Alloy: | | | | | | |
| #1 | 1 | None | Bal. | 17,500 | 0.5 | 3 |
| #2 | 5 | None | Bal. | 17,500 | 3.8 | 5 |
| #3 | 10 | None | Bal. | 22,500 | 0.3 | 4 |
| #4 | 10 | None | Bal. | 22,000 | 0.4 | 3 |
| #5 | 20 | None | Bal. | 22,500 | 0.2 | 3 |

An alloy of the composition of Example 5 (5 Zr, 15 W, bal. Nb) was fabricated into grips which were used for tensile testing and stress-rupture testing of refractory alloy specimens at high temperature in vacuum.

EXAMPLE 8

An alloy was prepared as given in Example 1, except that the composition of the alloy was 5% zirconium, 10% tungsten, 0.05% boron, and the balance columbium. This alloy was prepared by melting together 45.5 parts tungsten powder, 22.7 parts zirconium sponge, 11.4 parts of a master alloy comprising 2% boron by weight, balance columbium, and 374.6 parts of columbium powder. The ingot was prepared for testing in the manner described in Example 1, was heat-treated at 1400° C. for 16 hours in vacuum, cooled to room temperature, and was tested for tensile strength at 1100° C. in vacuum. The results are given in Table III below.

EXAMPLE 9

An alloy comprising 5% zirconium, 15% tungsten, 0.05% boron, balance columbium, was prepared in the same manner as given in the previous example. Results of testing for high temperature tensile properties are given in Table III below.

TABLE III

[Tensile Strength testing of Nb-Zr-W-B alloys—Heat treatment 16 hrs. at 1,400° C.—Tested in vacuum at 1,100° C. at a strain rate of 0.067 per minute]

| Percent Composition | | | | Strength | | Ductility | |
|---|---|---|---|---|---|---|---|
| Zr | W | C | B | Nb | 0.2+ Yield (p.s.i.) | Ultimate Tensile (p.s.i.) | Percent Reduction in Cross Sectional Area | Percent Elongation in ¾" Gauge Length; 0.125" Diam. |
| Alloy of Ex.: | | | | | | | | |
| 8........  5 | 10 | .... | 0.05 | Bal. | 40,000 | 52,000 | 39 | 20 |
| 9........  5 | 15 | .... | 0.05 | Bal. | 45,000 | 54,800 | 15 | 6 |

EXAMPLES 10 TO 15, INCLUSIVE

Additional alloy samples were prepared in the same manner as described for the alloys of Examples 8 and 9. In the case of Examples 15 and 16, carbon was added in the form of a binary master alloy of columbium containing 2% carbon. The specimens so prepared were subjected to stress-rupture tests at elevated temperatures. The results of these tests are given in Table IV below.

TABLE IV

[Stress-rupture testing of Nb-Zr-W-B-C alloys—Heat treatment: 16 hrs. at 1,400° C.— Tested in vacuum at 1,100° C.]

| Percent Composition | | | | | Stress (p.s.i.) | Time-to-Rupture (Hrs.) | Percent Elongation in 1" Gauge Length; 0.160" Diam. |
|---|---|---|---|---|---|---|---|
| Zr | W | B | C | Nb | | | |
| Alloy of Example: | | | | | | | |
| 10........  5 | 10 | 0.05 | ........ | Bal. | 30,000 | 8.4 | 30 |
| 11........  5 | 10 | 0.05 | ........ | Bal. | 25,000 | 24.3 | 36 |
| 12........  5 | 15 | 0.05 | ........ | Bal. | 30,000 | 12.5 | 27 |
| 13........  5 | 15 | 0.05 | ........ | Bal. | 25,000 | 30.5 | 23 |
| 14........  5 | 10 | 0.05 | 0.1 | Bal. | 35,000 | 6.2 | 40 |
| 15........  5 | 5 | 0.05 | 0.1 | Bal. | 28,500 | 2.3 | 41 |

It will be seen from the above examples that the alloys of this invention exhibit high strength at elevated temperatures. Moreover, the stress-rupture tests on the alloys of this invention, as compared with those on the Nb–Zr binaries, are indicative of the creep resistance of the new alloys herein claimed. As a general rule, the longer the time required for a metal to rupture under a given stress and at a given temperature, the lower the creep rate of the metal. It will be seen from Tables II and IV that the alloys of this invention have longer "times-to-rupture" than Nb–Zr binaries, even when far greater stresses are used, thus indicating a very siginficant improvement in creep resistance.

The alloys of this invention will, of course, contain small amount of incidental impurities such as oxygen, nitrogen, carbon, etc., which are initially present in the constituent elements. Certain of these impurities will to some extent affect the properties of the alloys, and in adding the optional elements which have been heretofore specified, the quantity of these elements present as impurities should be taken into consideration in determining the total amount of such elements present in the alloy.

The alloys of this invention will be found useful as materials of construction where a high-temperature refractory alloy is required for long service at temperatures of 1000° C. and above. For example, they are particularly suitable as supports and linings in furnaces used for the high-temperature treatment of metals in vacuum or in inert gases. It is also contemplated to coat or clad the alloys of this invention so as to make them more resistant to oxidation or the action of corrosive gases.

Since it is obvious that many changes and modifications can be made in the above-described details without departing from the nature and spirit of the invention, it is to be understood that the invention is not to be limited to said details except as set forth in the appended claim.

The embodiments of the invention in which an exclusive property or privilege is claimed are defined as follows:

1. A high-strength columbium-base alloy consisting essentially of, by weight, about 3% zirconium, about 5 to 18% tungsten, and up to about 0.2% in total of the elements selected from the group consisting of boron and carbon, the balance being essentially columbium.

References Cited

UNITED STATES PATENTS 2,822,268   2/1958   Hix _____ 75—174

FOREIGN PATENTS 1,190,580   4/1959   France.

OTHER REFERENCES

"Metal Progress," June 1960, article by Jahnke et al., page 73 relied upon.

CHARLES N. LOVELL, *Primary Examiner.*

DAVID L. RECK, RAY K. WINDHAM, *Examiners.*

W. B. NOLL, W. C. TOWNSEND, *Assistant Examiners.*